United States Patent
Jeong et al.

(10) Patent No.: US 12,194,896 B2
(45) Date of Patent: Jan. 14, 2025

(54) SEAT FOR VEHICLE

(71) Applicants: Hyundai Motor Company, Seoul (KR); Kia Corporation, Seoul (KR); Hyundai Transys Inc., Chungcheongnam-do (KR)

(72) Inventors: Dong Woo Jeong, Gyeonggi-do (KR); Han Su Yoo, Gyeonggi-do (KR); Jung Sang You, Gyeonggi-do (KR); Guk Mu Park, Seoul (KR); Myung Hoe Kim, Seoul (KR); Eun Sue Kim, Gyeonggi-do (KR); Dae Hee Lee, Incheon (KR); Jun Sik Hwang, Gyeonggi-do (KR); Gwon Hwa Bok, Gyeonggi-do (KR); Hae Dong Kwak, Gyeonggi-do (KR); Jae Sung Shin, Gyeonggi-do (KR); Han Kyung Park, Gyeonggi-do (KR); Jae Hoon Cho, Gyeonggi-do (KR)

(73) Assignees: Hyundai Motor Company, Seoul (KR); Kia Corporation, Seoul (KR); Hyundai Transys Inc., Chungcheongnam-do (KR)

( * ) Notice: Subject to any disclaimer, the term of this patent is extended or adjusted under 35 U.S.C. 154(b) by 303 days.

(21) Appl. No.: 17/977,923

(22) Filed: Oct. 31, 2022

(65) Prior Publication Data
US 2023/0191959 A1    Jun. 22, 2023

(30) Foreign Application Priority Data
Dec. 16, 2021   (KR) ........................ 10-2021-0180801

(51) Int. Cl.
*B60N 2/12*    (2006.01)
*B60N 2/20*    (2006.01)
(Continued)

(52) U.S. Cl.
CPC ............ *B60N 2/2209* (2013.01); *B60N 2/12* (2013.01); *B60N 2/20* (2013.01); *B60N 2/3013* (2013.01)

(58) Field of Classification Search
CPC ... B60N 2/20; B60N 2/12; B60N 2/07; B60N 2/2236; B60N 2/2209; B60N 2/3013; B60N 2/305
(Continued)

(56) References Cited

U.S. PATENT DOCUMENTS 7,510,228 B2 *   3/2009   Ito ........................ B60N 2/2209
                                                            296/65.17
9,308,836 B2 *   4/2016   Hausler ................ B60N 2/3031

FOREIGN PATENT DOCUMENTS

JP    H1086720 A    *    4/1998
KR    10-2019-0138531 A    12/2019
KR    10-2021-0016886 A    2/2021

OTHER PUBLICATIONS

JP1086720 Text (Year: 1998).*

* cited by examiner

*Primary Examiner* — Dennis H Pedder
(74) *Attorney, Agent, or Firm* — Fox Rothschild LLP

(57) ABSTRACT

A seat for a vehicle is proposed. The seat for a vehicle is configured to perform sliding of a seat cushion in conjunction with reclining of a seatback without a separate driver part or recliner, and to realize tipping-up of the seat cushion with the seat cushion and the seatback removably provided, and to be easily mounted and assembled to a vehicle to secure the inside space utilization of the vehicle and achieve cost reduction.

17 Claims, 8 Drawing Sheets

(51) Int. Cl.
 *B60N 2/22* (2006.01)
 *B60N 2/30* (2006.01)
(58) Field of Classification Search
 USPC ..... 296/65.03, 16, 9; 297/344.1, 0.25, 354.1
 See application file for complete search history.

SEAT FOR VEHICLE

CROSS REFERENCE TO RELATED APPLICATION

The present application claims priority to Korean Patent Application No. 10-2021-0180801, filed Dec. 16, 2021, the entire contents of which is incorporated herein for all purposes by this reference.

1. FIELD

The present disclosure relates generally to a seat for a vehicle. More particularly, the present disclosure relates to a vehicle seat configured to perform sliding of a seat cushion in conjunction with reclining of a seatback without a separate driver part or recliner, and to realize tipping-up of the seat cushion with the seat cushion and the seatback removably provided, and to be easily mounted and assembled to a vehicle to secure the inside space utilization of the vehicle and achieve cost reduction.

2. BACKGROUND

A seat for a vehicle is configured to allow a driver or a passenger of the vehicle to sit with a comfortable position so that the passenger does not feel fatigued even on long trips. The seat generally includes a seat cushion supporting the weight of the passenger and installed on a bottom surface in the vehicle inside space to be slidable in a longitudinal direction of the vehicle, and a seatback installed to be rotatable with respect to the seat cushion and configured to support the back of the passenger.

Meanwhile, the boarding space of the vehicle may require various sizes to accommodate people of various body sizes and to load articles. Such requirement may be more necessary for a trunk of the vehicle or a rear seat where a wheel housing is located. In order to satisfy the requirement, conventionally, a separate drive part and a recliner core operated in conjunction with driving of the drive part are applied to the seat, so that the seat cushion is tipped up or the seatback is folded, and an angle of the seat can be freely adjusted.

However, as parts such as the drive part and the recliner core are additionally provided, the manufacturing cost of the vehicle is increased, and the weight of the vehicle seat is increased to reduce fuel efficiency, whereby inconvenience may be caused not only to a vehicle manufacturer but also to a user of a vehicle.

Therefore, in order to solve the above cost increase and weight increase problems, the need for a vehicle seat that can tip up the seat cushion and adjust a reclining angle of the seat back and has a simplified structure arises.

SUMMARY

Accordingly, in one aspect, the present disclosure has been made keeping in mind the above problems occurring in the related art, and the present disclosure is intended to provide a seat for a vehicle, wherein the seat is configured to perform sliding of a seat cushion in conjunction with reclining of a seatback without a separate driver part or recliner, and to realize tipping-up of the seat cushion with the seat cushion and the seatback removably provided, and to be easily mounted and assembled to a vehicle to secure the inside space utilization of the vehicle and achieve cost reduction.

In one aspect, a seat for a vehicle, the seat comprising: a) a seatback with a first guide pin protruding from each of opposite ends thereof; b) a seat cushion rotatably coupled to the seatback, and with a second guide pin protruding from each of opposite ends thereof; c) a seatback bracket configured to be provided in a vehicle body and located at each side of the seatback; and d) a seat cushion bracket configured to be provided in the vehicle body and located at each side of the seat cushion, having a plurality of locking portions to allow the second guide pin of the seat cushion to be locked by the locking portions.

In certain aspects, suitably the seatback bracket is configured to support load of the seatback while the first guide pin of the seatback is inserted thereinto, and configured to rotate the seatback on the first guide pin.

In certain aspects, suitably the seat cushion bracket is configured to determine a sliding position of the seat cushion in response to a locked position of the second guide pin.

In an additional aspect, a seat for a vehicle is provided, the seat comprising: a seatback with a first guide pin protruding from each of opposite ends thereof; a seat cushion rotatably coupled to the seatback, and with a second guide pin protruding from each of opposite ends thereof; a seatback bracket configured to be provided in a vehicle body and located at each side of the seatback, configured to support load of the seatback while the first guide pin of the seatback may be inserted thereinto, and configured to rotate the seatback on the first guide pin; and a seat cushion bracket configured to be provided in the vehicle body and located at each side of the seat cushion, having a plurality of locking portions to allow the second guide pin of the seat cushion to be selectively locked by the locking portions, and configured to determine a sliding position of the seat cushion in response to a locked position of the second guide pin.

In certain aspects, when positions of the seatback and the seat cushion are adjusted, the seatback may be tilted in response to rotation of the first guide pin, and as the second guide pin is moved in conjunction with tilted movement of the seatback, the seat cushion may slide in a direction opposite to a tilted direction of the seatback.

In certain aspects, the seatback bracket may be provided in line with a belt line of the vehicle body and be connected to an upper end of the seatback, and the seat cushion bracket may be provided at a front portion of a wheel housing of the vehicle body and be connected to a front end of the seat cushion.

In certain aspects, the seatback may have a first extension part extended in a top to down direction with a lower end thereof protruding in a longitudinal direction of the vehicle, and the seat cushion may have a second extension part extended in a front to rear direction with a rear portion thereof protruding in a height direction of the vehicle, wherein the first extension part and the second extension part may be rotatably connected to each other.

In certain aspects, the second extension part may be connected to the first extension part in a state where an end of the second extension part may be inserted in the seatback.

In certain aspects, the seatback bracket may have a guide groove into which the first guide pin may be inserted and seated, and the guide groove may consist of an open slot configured to allow the first guide pin to be inserted into and taken out from the guide groove and a rotary slot connected to the open slot and configured to allow the first guide pin to be rotatable while remaining in a seated state.

In certain aspects, the rotary slot may be connected to the open slot with an indent portion formed in the open slot, and an entrance of the indent portion may have an outer portion formed narrower than an inner portion thereof.

In certain aspects, as the first guide pin of the seatback is inserted into or taken out through the open slot, the seat may be assembled to or removed from the vehicle body.

The plurality of locking portions suitably may have a shape inclined in the top to down direction so that a front end of each of the locking portions may be located higher than a rear end thereof.

The seat cushion bracket suitably may have a moving slot connected to the plurality of locking portions and configured to allow the second guide pin to be moved forward and rearward.

The moving slot suitably may have an opening at a front portion thereof and configured to allow the second guide pin to be inserted into or taken out from the locking portions.

When the seat is tipped up, the second guide pin of the seat cushion may be removed through the opening of the moving slot, and when the seat cushion is rotated so that a seating surface of the removed seat cushion and a seating surface of the seatback are brought into contact with each other, the seat may be tipped up.

The seatback suitably may include a headrest, and the seat cushion may include a hook connector configured to be fastened to the headrest of the seatback to lock the headrest.

According to the present disclosure, the vehicle seat is configured to perform sliding of a seat cushion in conjunction with reclining of a seatback without a separate driver part or recliner, and to realize tipping-up of the seat cushion with the seat cushion and the seatback removably provided, and to be easily mounted and assembled to a vehicle, so that it is possible to secure the inside space utilization of the vehicle and achieve cost reduction.

In additional aspects, vehicles are provided that comprises a seat and seat assembly as disclosed herein.

Thus, in one aspect, a vehicle is provided that comprises a seat for a vehicle, the seat system comprising: a) a seatback with a first guide pin protruding from each of opposite ends thereof; b) a seat cushion rotatably coupled to the seatback, and with a second guide pin protruding from each of opposite ends thereof; c) a seatback bracket provided in a vehicle body and located at each side of the seatback, configured to support load of the seatback while the first guide pin of the seatback is inserted thereinto, and configured to rotate the seatback on the first guide pin; and a seat cushion bracket provided in the vehicle body and located at each side of the seat cushion, having a plurality of locking portions to allow the second guide pin of the seat cushion to be selectively locked by the locking portions, and configured to determine a sliding position of the seat cushion in response to a locked position of the second guide pin.

Other aspects are disclosed infra.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
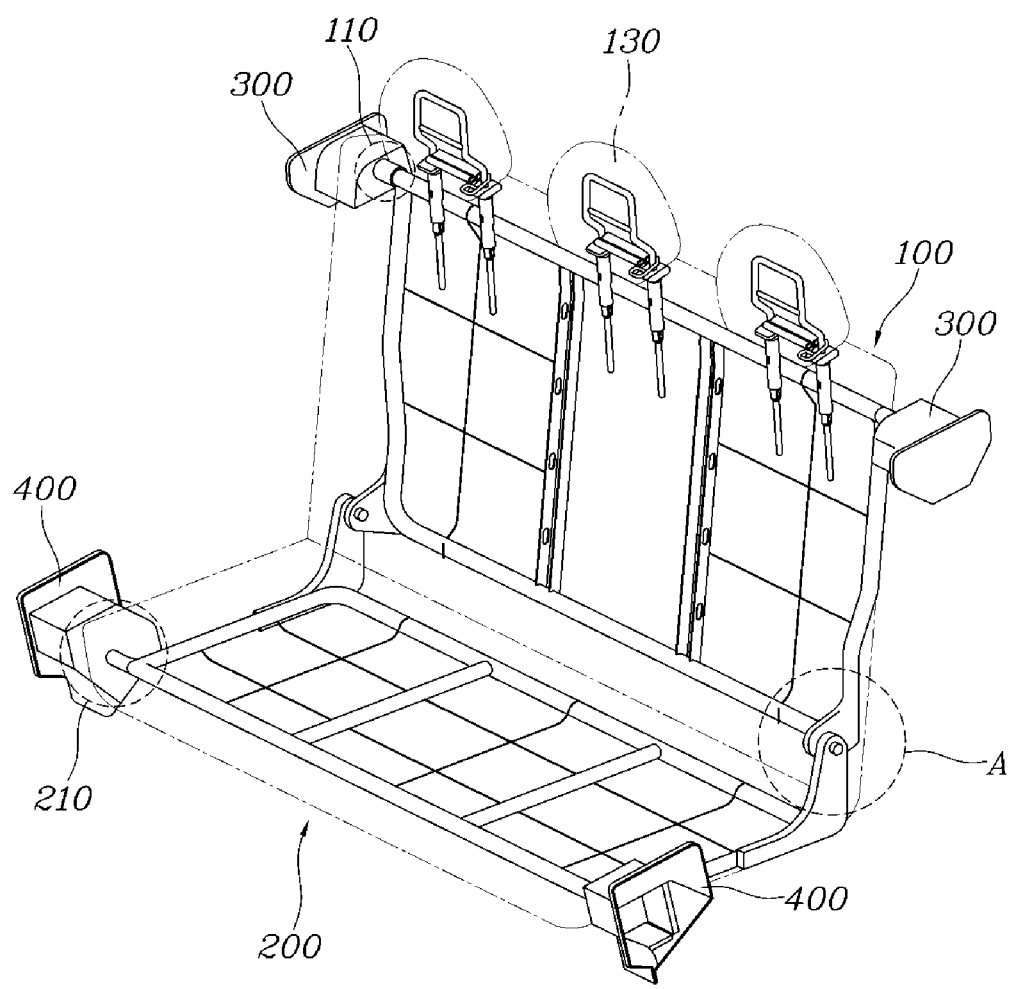
FIG. 1 is a view showing a seat for a vehicle according to an embodiment of the present disclosure.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 2:
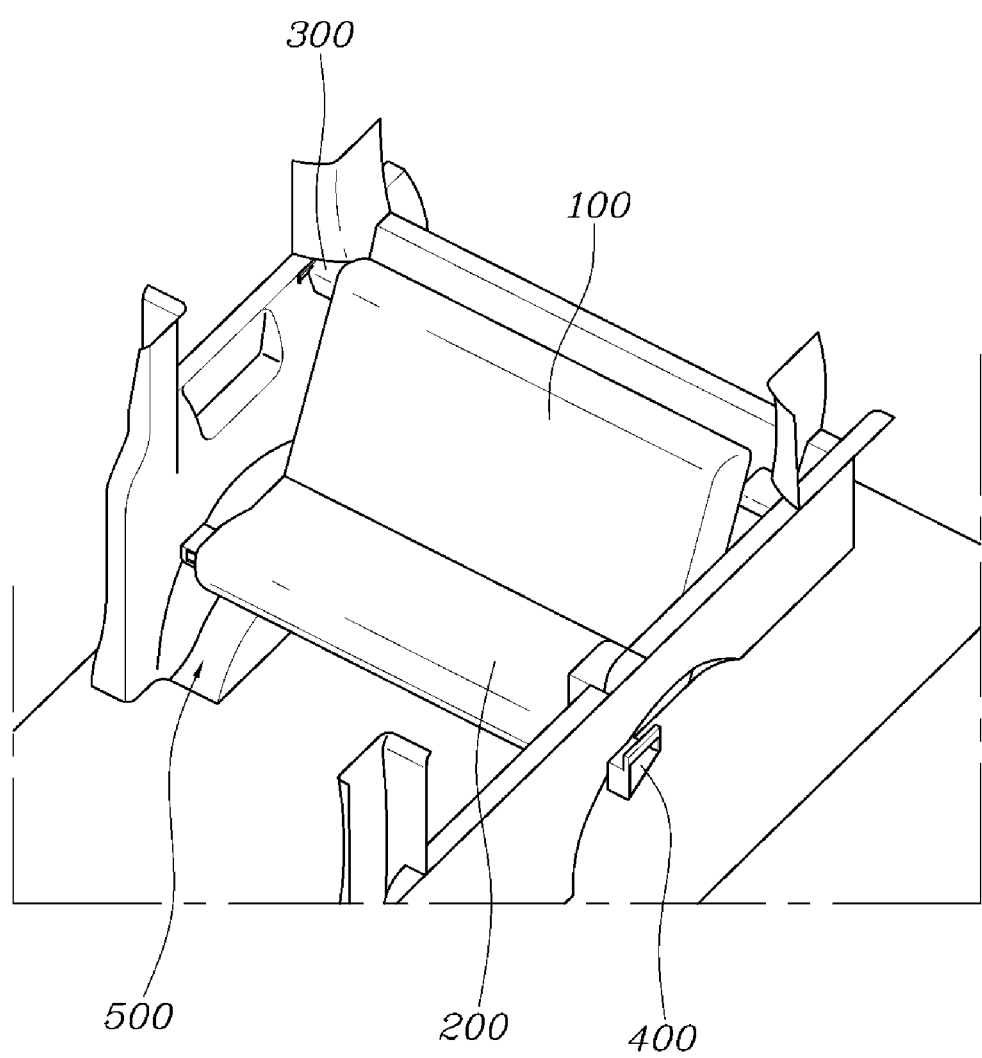
FIG. 2 is a view showing a state where the seat for a vehicle of the present disclosure in FIG. 1 is assembled to a vehicle.
Figure 3:
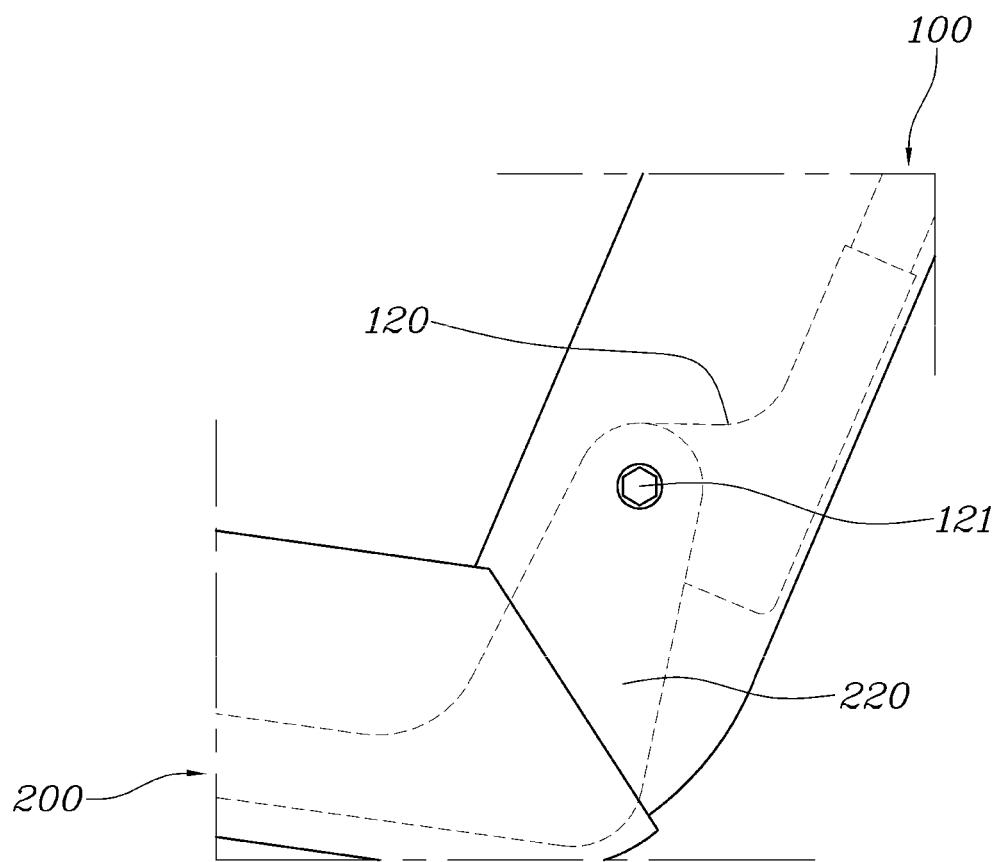
FIG. 3 is an enlarged view showing 'area A' in FIG. 1 according to the present disclosure.
Figure 4:
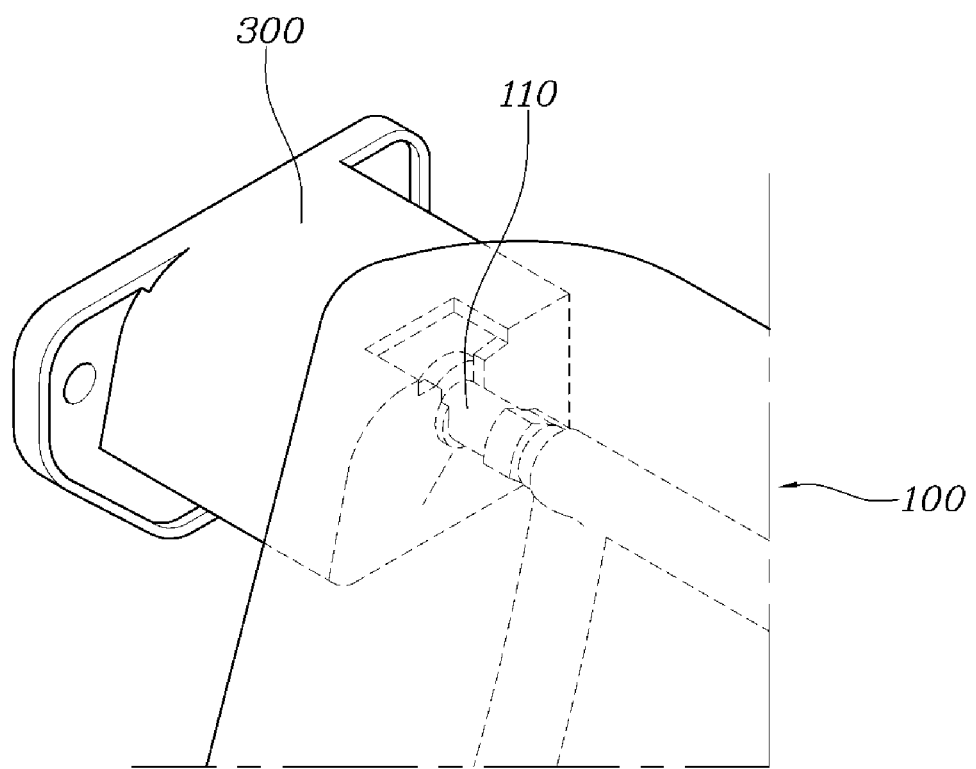
FIG. 4 is a view showing a state where a first guide pin is connected to a seatback bracket of the seat for a vehicle according to the embodiment of the present disclosure.
Figure 5:
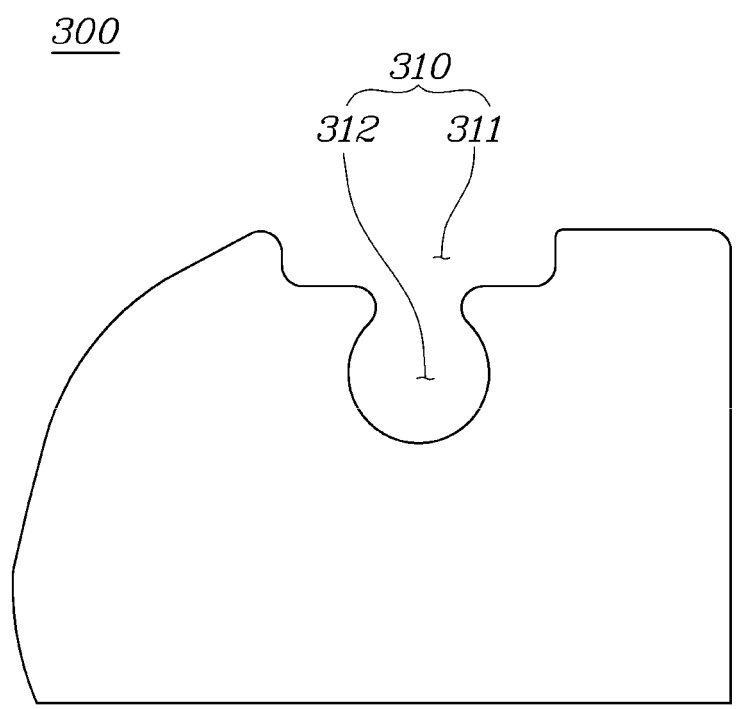
FIG. 5 is a view showing the seatback bracket of the seat for a vehicle according to the embodiment of the present disclosure.
Figure 6:
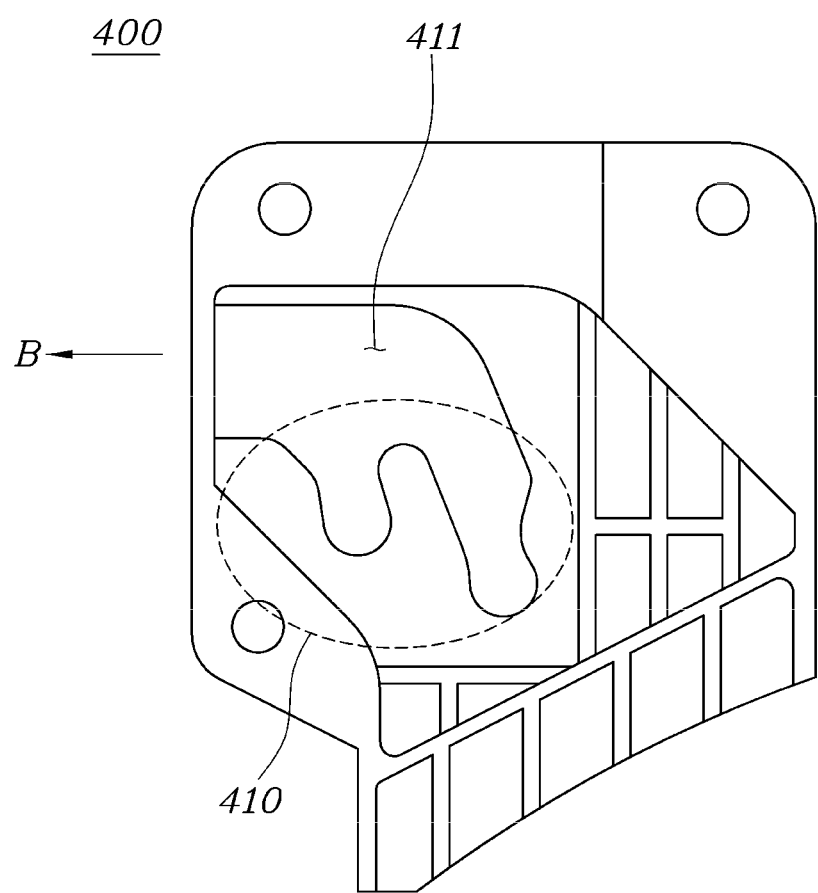
FIG. 6 is a view showing a seat cushion bracket of the seat for a vehicle according to the embodiment of the present disclosure.
Figure 7:
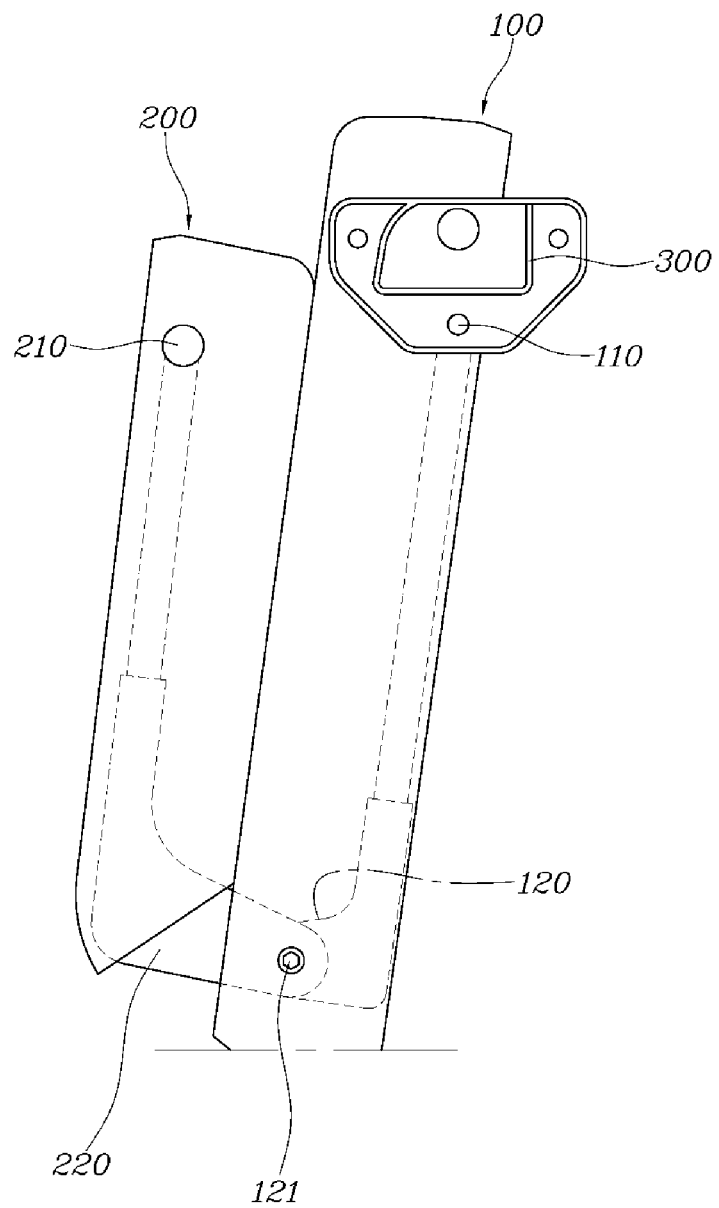
FIG. 7 is a view showing a state where a seat cushion of the seat for a vehicle according to the embodiment of the present disclosure is tipped up.
Figure 8:
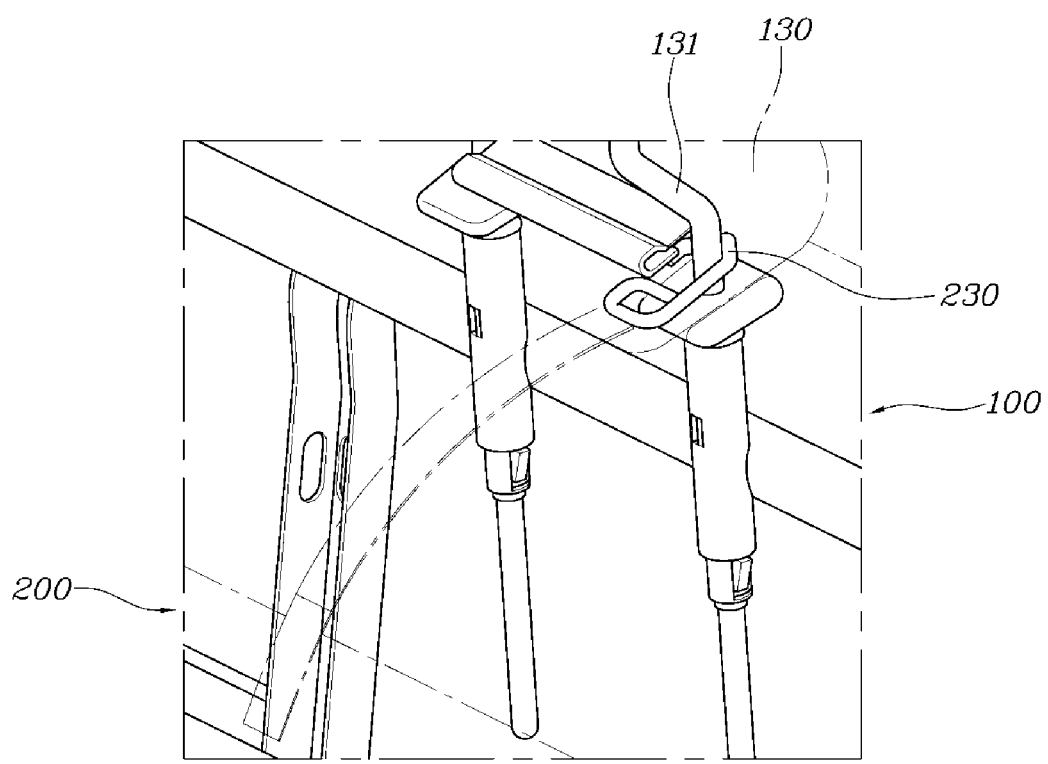
FIG. 8 is a view showing a state where a hook connector is fastened to a headrest of the seat for a vehicle according to the embodiment of the present disclosure.

Hereinbelow, the configuration and the operational principle of various embodiments disclosed in the present disclosure will be described in detail with reference to accompanying drawings FIG. 1 is a view showing a seat for a vehicle according to an embodiment of the present disclosure. FIG. 2 is a view showing a state where the seat for a vehicle of the present disclosure in FIG. 1 is assembled to a vehicle. FIG. 3 is an enlarged view showing 'area A' in FIG. 1 according to the present disclosure. FIG. 4 is a view showing a state where a first guide pin 110 is connected to a seatback bracket 300 of the seat for a vehicle according to the embodiment of the present disclosure. FIG. 5 is a view showing the seatback bracket 300 of the seat for a vehicle according to the embodiment of the present disclosure. FIG. 6 is a view showing a seat cushion bracket 400 of the seat for a vehicle according to the embodiment of the present disclosure. FIG. 7 is a view showing a state where a seat cushion of the seat for a vehicle according to the embodiment of the present disclosure is tipped up. FIG. 8 is a view showing a state where a hook connector 230 is fastened to a headrest 130 of the seat for a vehicle according to the embodiment of the present disclosure.

Referring to FIG. 1, the seat for a vehicle according to the present disclosure includes a seatback 100 with the first guide pin 110 protruding from each of opposite ends thereof, a seat cushion 200 rotatably coupled to the seatback 100, and with a second guide pin 210 protruding from each of opposite ends thereof, the seatback bracket 300 provided in a vehicle body and located at each side of the seatback 100, configured to support the weight of the seatback 100 while the first guide pin 110 of the seatback 100 is inserted into the seatback bracket 300 and to rotate the seatback 100 on the first guide pin 110, and the a seat cushion bracket 400 provided in the vehicle body and located at each side of the seat cushion 200, including a plurality of locking portions 410 to allow the second guide pin 210 of the seat cushion 200 to be selectively locked to the locking portions 410, and configured to determine a sliding position of the seat cushion 200 in response to a locked position of the second guide pin 210.

The seat for a vehicle is suitably configured to allow a driver or a passenger of the vehicle to sit with a comfortable position so that the passenger does not feel fatigued even on long trips. In certain aspects, the seat generally includes the seat cushion 200 supporting the weight of the passenger and installed on a bottom surface in the vehicle interior to be slidable in a longitudinal direction of the vehicle, and the seatback 100 installed to be rotatable with respect to the seat cushion 200 and configured to support the back of the passenger.

Each of the seatback 100 and the seat cushion 200 includes a seat frame forming the frame thereof to maintain the shape thereof and a seat cover covering the seat frame. In the specification, the seat frame and the seat cover are not described separately, but will be described on the premise that they are included in both the seatback 100 and the seat cushion 200.

In other words, in the specification, it may be understood that 'the seatback 100' refers to both a seatback frame and a seatback cover or any one of the seatback frame and the seatback cover. Likewise, in the specification, it may be understood that 'the seat cushion 200' refers to both a seat cushion frame and a seat cushion cover or any one of the seat cushion frame and the seat cushion cover.

The seatback 100 of the seat for a vehicle according to the present disclosure includes the first guide pin 110 protruding from each of the opposite ends of the seatback 100 and the seat cushion 200 includes the second guide pin 210 protruding from each of the opposite ends of the seat cushion 200, and the seatback 100 and the seat cushion 200 are rotatably coupled to each other.

Specifically, a first portion of the seatback frame and a first portion of the seat cushion frame are rotatably connected to each other, and the first guide pin 110 and the second guide pin 210 are provided in second portions of the seatback frame and the seat cushion frame, respectively. The first guide pin 110 is extended from an end of the seatback frame and an extended portion of the first guide pin 110 protrudes outward of the seatback cover. Likewise, the second guide pin 210 is extended from an end of the seat cushion frame, and an extended portion of the second guide pin 210 protrudes outward of the seat cushion cover.

Furthermore, the vehicle body of the vehicle equipped with the seat for a vehicle according to the present disclosure includes the seatback bracket 300 into which the first guide pin 110 is inserted and the seat cushion bracket 400 into which the second guide pin 210 is inserted. Specifically, the seatback bracket 300 is provided at each of the opposite sides of the seatback 100 so that the first guide pin 110 protruding from each of the opposite ends of the seatback 100 may be inserted into the seatback bracket 300, and as the first guide pin 110 is inserted into the seatback bracket 300, the seatback bracket 300 supports the load of the seatback 100. The first guide pin 110 is rotated in a state of being inserted into the seatback bracket 300, thereby adjusting an angle of the seatback 100.

In other words, when a user of the vehicle leans the back against the seatback 100, as the seatback 100 is naturally rotated on the first guide pin 110 in a state where the seatback 100 is in close contact with the back of the user, the user can feel comfort.

Moreover, the seat cushion bracket 400 is provided at each of the opposite sides of the seat cushion 200 so that the second guide pin 210 protruding from each of the opposite ends of the seat cushion 200 may be inserted into the seat cushion bracket 400, and the plurality of locking portions 410 adjusts a position of the second guide pin 210 to adjust a sliding position of the seat cushion 200.

Herein, the plurality of locking portions 410 may have a shape (for example, a groove shape) formed by passing through the seat cushion bracket 400. In other words, as the second guide pin 210 is inserted into and caught to the groove, a position of the seat cushion 200 is locked, and as the second guide pin 210 is selectively inserted into and caught to the plurality of portions, a position of the seat cushion 200 is determined.

In other words, when the user of the vehicle changes a position of the seat cushion 200, the user can perform positioning or sliding of the seat cushion 200 by moving a caught position of the second guide pin 210.

Therefore, with the connection between each guide pin 110, 210 and each bracket 300, 400, reclining of the seatback 100 and sliding of the seat cushion 200 may be performed without a separate driver part or a recliner core, manufacturing costs of the seat for a vehicle can be reduced while improving user convenience.

For reference, in the specification, 'tilting or tilted movement of the seatback 100' means reclining or folding of the seatback 100, and means both reclining or folding of the seatback 100 or any one of reclining and folding of the seatback 100.

Meanwhile, in the seat for a vehicle of according to the present disclosure, when positions of the seatback 100 and the seat cushion 200 are adjusted, the seatback 100 is tilted in response to rotation of the first guide pin 110, and as the second guide pin 210 is moved in conjunction with a tilted movement of the seatback 100, the seat cushion 200 may slide in a direction opposite to a tilted direction of the seatback 100.

In other words, each guide pin 110, 210 inserted into each bracket 300, 400 serves as a rotation center to a portion A where the seatback 100 and the seat cushion 200 are connected to each other, so that the seat cushion 200 may slide in conjunction with reclining of the seatback 100.

To describe in detail operation of the seat, when the first guide pin 110 is rotated while being inserted in the seatback bracket 300, the seatback 100 is tilted in a rotating direction of the first guide pin 110. As the portion where the seatback 100 and the seat cushion 200 are connected to each other is rotated together with the seatback 100 with the first guide pin 110 as the rotation center, a torque due to the rotation is applied to the seat cushion 200. The torque applied to the seat cushion 200 generates an external force in a direction opposite to the tilted direction of the seatback 100, thereby determining the sliding direction of the seat cushion 200. For example, when the seatback 100 is tilted rearward, an external force is generated in a forward direction of the seat cushion 200, and when the seatback 100 is tilted forward, an external force is generated in a rearward direction of the seat cushion 200. Accordingly, while the second guide pin 210 of the seat cushion 200 is moved forward or rearward while being inserted into the seat cushion bracket 400, and the seat cushion 200 slides.

For reference, in conjunction with the tilted movement of the seatback 100, sliding of the seat cushion 200 may be performed, and in conjunction with the sliding movement of the seat cushion 200, tilting of the seatback 100 may be performed. The above case will be easily understood by applying the operation principle described above in the reverse order, and it will be omitted in the present specification, but the scope of the present disclosure is not limited by this description.

FIG. 2 is a view showing a state where the seat for a vehicle of the present disclosure in FIG. 1 is assembled to a vehicle.

Referring to FIG. 2, the seatback bracket 300 of the seat for a vehicle of according to the present disclosure is installed in line with a belt line of the vehicle body and is connected to an upper end of the seatback 100. The seat cushion bracket 400 is installed at a front portion of a wheel housing 500 of the vehicle body and may be connected to a front end of the seat cushion 200.

Herein, the belt line of the vehicle body is a line representing a boundary line between a side window glass and a door panel of the vehicle. In other words, as the seatback bracket 300 is installed in line with the belt line of the vehicle body as described above, when the user of the vehicle sits in the seat, the user can easily look out the side window glass while leaning the back against the seatback 100.

Furthermore, the seat for a vehicle according to the present disclosure may be particularly meaningful when being used as a rear seat. The wheel housing 500 is generally located in the rear seat to reduce the space utilization, so that the rear seat is most often used as a trunk space of a vehicle. Moreover, in a case of a rear-wheel drive vehicle, automotive electronic components such as an engine and a motor are provided inside the wheel housing 500. In this case, since the weight of the vehicle body is concentrated at the rear of the vehicle, a conventional seat for a vehicle that should include parts such as a separate drive part and a recliner core may have a limitation in application thereof.

However, when the seat cushion bracket 400 is installed at the front portion of the wheel housing 500 of the vehicle body as in the present disclosure, the second guide pin 210 is inserted into and moved in the seat cushion bracket 400, whereby the function of the conventional seat for a vehicle can be realized and the above limitation can be improved.

FIG. 3 is an enlarged view showing 'area A' in FIG. 1 according to the present disclosure.

Referring to FIG. 3, the seatback 100 of the seat for a vehicle of according to the present disclosure includes a first extension part 120 extended in a top to down direction with a lower end thereof protruding in a longitudinal direction of the vehicle. The seat cushion 200 includes a second extension part 220 extended in a front to rear direction with a rear portion thereof protruding in a height direction of the vehicle. The first extension part 120 and the second extension part 220 may be rotatably connected to each other.

Specifically, the seatback 100 is formed to be extended in the top to down direction to support the back of the user, and the seat cushion 200 is formed to be extended in the front to rear direction to support the hip portion and the lower body of the user.

Meanwhile, as described above, when the seatback 100 is tilted as the first guide pin 110 is rotated, a torque due to the rotation is applied to the seat cushion 200, and the torque generates an external force in a direction opposite to the tilted direction of the seatback 100, thereby determining a sliding direction of the seat cushion 200.

In other words, as the lower end of the seatback 100 has the first extension part 120 extended by protruding in the longitudinal direction of the vehicle, the torque applied to the seat cushion 200 in tilting of the seatback 100 may be generated as described above. As the rear portion of the seat cushion 200 has the second extension part 220 extended by protruding in the height direction of the vehicle, an external force in a direction opposite to the tilted direction of the seatback 100 may be generated in the seat cushion 200 by the torque generated as described above.

Furthermore, the first extension part 120 and the second extension part 220 suitably are rotatably connected to each other, so that a folding function of the seatback 100 or a tip-up function of the seat cushion 200 may be realized. In other words, folding of the seatback 100 may be realized as the first extension part 120 is rotated while the second extension part 220 is locked, and tipping-up of the seat cushion 200 may be realized as the second extension part 220 is rotated while the first extension part 120 is locked.

Herein, a connected point 121 between the first extension part and the second extension part may be provided in other general rotatable connection methods such as hinge coupling, etc. However, such an example is merely a description to help the understanding of the present disclosure, and the present disclosure should not be construed by the limitation.

Meanwhile, the second extension part 220 may be connected to the first extension part 120 in a state where an end thereof is inserted in the seatback 100.

Accordingly, the connected point 121 between the first extension part and the second extension part is located inside the seatback 100. When the connected point 121 between the first extension part and the second extension part is located at the outside space of the seatback 100, the seat cushion 200 is not completely in close contact with the seatback 100 in tipping-up the seat cushion 200. Referring to FIG. 7 to help explain this operation.

FIG. 7 is a view showing a state where the seat cushion 200 of the seat for a vehicle according to the embodiment of the present disclosure is tipped up.

In general, the user of the vehicle uses the tip-up function of the seat cushion 200 when using the interior space of the vehicle widely. Therefore, when the seat cushion 200 is tipped up, the seatback 100 and the seat cushion 200 should be completely in close contact with each other as shown in FIG. 7, so that the interior space of the vehicle may be secured the widest.

Furthermore, various vibrations may occur due to bumps, etc., in driving of the vehicle, and accordingly, the seat cushion 200 is rotated again forward to be recovered to a state before the tipped-up movement. In this case, there is a risk of damage to items that the user has placed in the interior space secured by tipping up of the seat cushion 200 for a while. When the seatback 100 and the seat cushion 200 are completely in close contact with each other, a contact area between the seatback 100 and the seat cushion 200 are maximized to increase friction, and the above-described risk can be reduced.

Therefore, when the seat cushion 200 has been tipped up, as shown in FIG. 7, it is preferable that the seatback 100 and the seat cushion 200 are completely in close contact with each other. However, when the connected point 121 between the first extension part and the second extension part is located at the outside space of the seatback 100, contrary to FIG. 7, a gap is generated below the contact surface between the seatback 100 and the seat cushion 200 so that the seat cushion 200 and the seatback 100 are not completely in close contact with each other.

For the above reason, in order to locate the connected point 121 between the first extension part and the second extension part inside the seatback 100, the second extension part 220 is connected to the first extension part 120 while the end of the second extension part 220 is inserted in the seatback 100.

FIG. 4 is a view showing a state where the first guide pin 110 is connected to the seatback bracket 300 of the seat for a vehicle according to the embodiment of the present disclosure. FIG. 5 is a view showing the seatback bracket 300 of the seat for a vehicle according to the embodiment of the present disclosure.

Referring to FIGS. 4 and 5, the seatback bracket 300 of the seat for a vehicle of according to the present disclosure has a guide groove 310 into which the first guide pin 110 is inserted and seated. The guide groove 310 consists of an open slot 311 configured to allow the first guide pin 110 to be inserted and taken out and a rotary slot 312 connected to the open slot 311 and configured to allow the first guide pin 110 to be rotatable in a seated state.

In other words, the guide groove 310 of the seatback bracket 300 is formed, so that the first guide pin 110 may be inserted into the seatback bracket 300, and as the first guide pin 110 is rotated while being inserted in the guide groove 310, the seatback 100 may be tilted.

Specifically, the guide groove 310 suitably comprises open slot 311 through which the first guide pin 110 may be inserted and taken out and the rotary slot 312 connected to the open slot 311 and in which the first guide pin 110 may be rotated while being seated therein. The first guide pin 110 is inserted into or taken out from the seatback bracket 300 through the open slot 311. The rotary slot 312 is provided at a lower end of the open slot 311 to be connected to the open slot 311, so that the first guide pin 110 may be rotated while being seated in a predetermined position.

As referred to herein, the predetermined position means a position where the first guide pin 110 is seated in the rotary slot 312 without being separated outward from the rotary slot 312. More specifically, since the first guide pin 110 suitably should be rotated in the rotary slot 312, it is preferable that the size of the rotary slot 312 is formed slightly larger than a sectional area of the first guide pin 110. Therefore, the first guide pin 110 may be slightly moved while being inserted in the rotary slot 312. Accordingly, although a position of the first guide pin 110 may be slightly changed, it is preferable to understand that the above-mentioned predetermined position includes a difference due to the slight variation.

Therefore, as the guide groove 310 is formed in the seatback bracket 300, a position of the first guide pin 110 may be locked and the first guide pin 110 may be rotated at the position. Accordingly, there is an effect that the seatback 100 may be removably coupled to a desired position easily and the tilting movement of the seatback 100 may be realized.

Meanwhile, to describe in detail the detailed shape of the guide groove 310, the rotary slot 312 is connected to the open slot 311 with an indent portion, and an entrance of the indent portion may have an outer portion that is formed narrower than an inner portion.

Referring to FIG. 5, the open slot 311 suitably is formed at an upper end of the seatback bracket 300, and the open slot 311 has the indent portion, thereby forming the rotary slot 312. Herein, in order to prevent the first guide pin 110 inserted in the rotary slot 312 from being separated from the rotary slot 312, the entrance of the indent portion may have the outer portion formed narrower than the inner portion.

Specifically, the outer portion of the entrance of the indent portion is formed slightly larger than a diameter or thickness of the first guide pin 110, so that the first guide pin 110 may be inserted into the rotary slot 312. Then, as the indent portion has the inner portion of the entrance thereof formed wider than the outer portion, the first guide pin 110 may pass through the indent portion to be stably seated in the rotary slot 312.

Furthermore, various vibrations may occur due to bumps, etc., in driving of the vehicle, and accordingly, there is a problem in that the first guide pin 110 in the rotary slot 312 is separated from the seatback bracket 300 while being moved in a direction toward the open slot 311. In other words, the seatback 100 is not locked to the vehicle body, thereby threatening the safety of the vehicle user.

Accordingly, according to the present disclosure, as the outer portion of the entrance of the indent portion is formed narrower than the inner portion, even when the first guide pin 110 in the rotary slot 312 is moved in the direction toward the open slot 311, the outer portion formed narrower than the inner portion limits movement of the first guide pin 110 to prevent the first guide pin 110 from being easily separated from the rotary slot 312.

Meanwhile, in the seat for a vehicle according to the present disclosure, the first guide pin 110 of the seatback 100 is inserted into or taken out from the rotary slot through the open slot 311, the seat may be assembled to the vehicle body or removed from the vehicle body.

Accordingly, the assembly of the seat becomes easier and thus productivity of the seat is improved, and the user of the vehicle can perform the assembly of the seat according to need. In other words, the user of the vehicle can assemble the seat for a vehicle according to the present disclosure to the vehicle body so as to secure additional seat space, or may easily remove the seat for a vehicle according to the present disclosure from the vehicle body when it is no longer necessary to secure the additional seat space at the end of use of the seat.

Accordingly, a vehicle manufacturer can secure additional market competitiveness by providing a separate parts market for the seat for a vehicle according to the present disclosure.

FIG. 6 is a view showing the seat cushion bracket 400 of the seat for a vehicle according to the embodiment of the present disclosure.

Referring to FIG. 6, the plurality of locking portions 410 of the seat for a vehicle according to the present disclosure suitably has a shape inclined in the top to down direction so that a front end thereof may be located higher than a rear end thereof.

This structure of the locking portions 410 allows to smoothly slide the second guide pin 210 in the seat cushion bracket 400, thereby realizing smooth sliding of the seat cushion 200.

In other words, when the seat cushion 200 slides forward and rearward in conjunction with the tilted movement of the seatback 100, the second guide pin 210 may be smoothly moved forward-upward or rearward-downward along the slope of each of the locking portions 410, and when the second guide pin 210 is located at a desired position in the locking portions 410, the second guide pin 210 may be locked to a desired one of the locking portions 410 along the slope.

Furthermore, when the plurality of locking portions 410 has the inclined shape, it is possible to prevent the second guide pin 210 from being separated from the locking portions 410 in driving of the vehicle.

Specifically, may occur due to bumps, etc., in driving of the vehicle, and when the vehicle stops suddenly while driving, the seat of the vehicle receives an inertial force. Accordingly, the second guide pin 210 is separated from the locking portion 410 and the seat cushion 200 is not locked to the vehicle body, so that the safety of the user may be threatened.

Therefore, the seat for a vehicle according to the present disclosure includes the plurality of locking portions 410 having the inclined shape, so that even when the second guide pin 210 is moved in the locking portion 410 or separated from the second guide pin 210 due to sudden stop of the vehicle, slight vibrations or manipulation of the user is applied to recover the second guide pin 210 to an initial position at a time when the second guide pin 210 is located around an entrance of the locking portion 410.

Meanwhile, the seat cushion bracket 400 of the seat for a vehicle according to the present disclosure may include a moving slot 411 connected to the plurality of locking portions 410 and allowing the second guide pin 210 to be moved forward and rearward. The moving slot 411 may have an opening at a front portion thereof to allow the second guide pin 210 to be inserted into or taken out from the locking portions 410.

Herein, the moving slot 411 may provide a connection part so as to smoothly move the first guide pin 110 to a user desired position of the plurality of locking portions 410. In other words, as a position of the second guide pin 210 may be adjusted by moving the second guide pin 210 from one of the locking portions 410 to the moving slot 411 through the moving slot 411 and then locating the second guide pin 210 to another locking portion 410 desired by the user. As described above, as a position of the second guide pin 210 is adjusted, a position of the seat cushion 200 may be adjusted.

Moreover, the moving slot 411 may have the opening at the front portion thereof so that the second guide pin 210 may be inserted into or taken out from the locking portions. It may be understood that the above structure is provided to realize the tip-up function of the seat cushion 200 or to assemble the seat cushion 200 to the vehicle body.

In other words, when the seat cushion 200 is tipped up, the second guide pin 210 is taken out through the opening of the moving slot 411 and then is separated from the seat cushion bracket 400, so that the user of the vehicle can use the interior space of the vehicle widely. The user of the vehicle can perform the assembly of the seat by removing and coupling the seat cushion 200 according to need.

Moreover, the vehicle manufacturer can perform the assembly of the seat easier and thus productivity of the seat is improved, and secure additional market competitiveness by providing a separate parts market for the seat for a vehicle according to the present disclosure.

Meanwhile, an operation principle of the tipped-up movement of the seat cushion 200 will be described in detail with reference to FIG. 7.

FIG. 7 is a view showing a state where the seat cushion 200 of the seat for a vehicle according to the embodiment of the present disclosure is tipped up.

Referring to FIG. 7, in the seat for a vehicle according to the present disclosure, when the seat is tipped up, the second guide pin 210 of the seat cushion 200 is removed through the opening of the moving slot 411. The seat cushion 200 is rotated to allow a seating surface of the removed seat cushion 200 and a seating surface of the seatback 100 to be in contact with each other, thereby achieving tipping up of the seat.

More specifically, the second guide pin 210 is taken out in a direction B through the opening of the moving slot 411 to be separated from the seat cushion bracket 400. Then, the seat cushion 200 is rotated upward on the connected point 121 between the first extension part and the second extension part, in the portion A where the seatback and the seat cushion are connected to each other, so that the seat cushion 200 is close to the seatback 100. Herein, as shown in FIG. 7, the upward rotating movement of the seat cushion 200 is performed until the seating surface of the seatback 100 and the seating surface of the seat cushion 200 are brought into contact with each other. In other words, as the seatback 100 and the seat cushion 200 are completely in close contact with each other, tipping of the seat cushion 200 is finished.

As described above, the tip-up function of the seat cushion 200 is realized without a separate drive part and a recliner core, the user of the vehicle can use the interior space of the vehicle widely, and the vehicle manufacturer can solve problems of the manufacturing costs and increasing the weight of the seat.

FIG. 8 is a view showing a state where a hook connector is fastened to the 130 headrest of the seat for a vehicle according to the embodiment of the present disclosure.

Referring to FIG. 8, the seatback 100 of the seat for a vehicle according to the present disclosure may include the headrest 130, and the seat cushion 200 may include the hook connector 230 fastened to and locking the headrest 130 of the seatback 100.

As described above, various vibrations may occur due to bumps, etc., in driving of the vehicle, and accordingly, the seat cushion 200 is rotated again forward to be recovered to a state before the tipped-up movement. In this case, there is a risk of damage to items that the user has placed in the interior space secured by tipping up of the seat cushion 200 for a while.

Therefore, in order to prevent the above risk, the seat cushion 200 includes the hook connector 230 and the headrest 130 of the seatback 100 is fastened to and locked by the hook connector 230, so that the seat cushion 200 may remain tipped up.

Specifically, the hook connector 230 is provided at a front portion of the seat cushion 200 and an end thereof is formed in a general fastening part such as a hook or a clip, so that the hook connector 230 may be fastened to a headrest stay 131 in a hooked manner.

Herein, instead of connecting the hook connector 230 to the headrest stay 131, a separate fastening means may be provided. However, as the headrest 130 and the headrest stay 131 generally provided in the seatback 100 of a vehicle are used, it is possible to stably maintain the tipped up state of the seat cushion 200 without changing the existing design of the seat.

Although the preferred embodiment of the present disclosure has been disclosed for illustrative purposes, those skilled in the art will appreciate that various modifications, additions, and substitutions are possible, without departing from the spirit and scope of the present disclosure.

What is claimed is:

1. A seat for a vehicle, the seat comprising:
a seatback with a first guide pin protruding from each of opposite ends thereof;
a seat cushion rotatably coupled to the seatback, and with a second guide pin protruding from each of opposite ends thereof;
a seatback bracket configured to be provided in a vehicle body and located at each side of the seatback; and
a seat cushion bracket configured to be provided in the vehicle body and located at each side of the seat cushion, having a plurality of locking portions to allow the second guide pin of the seat cushion to be locked by the locking portions.

2. The seat of claim 1 wherein the seatback bracket is configured to support load of the seatback while the first guide pin of the seatback is inserted thereinto, and configured to rotate the seatback on the first guide pin.

3. The seat of claim 1 wherein the seat cushion bracket is configured to determine a sliding position of the seat cushion in response to a locked position of the second guide pin.

4. The seat of claim 1, wherein when positions of the seatback and the seat cushion are adjusted, the seatback is tilted in response to rotation of the first guide pin, and as the second guide pin is moved in conjunction with tilted movement of the seatback, the seat cushion slides in a direction opposite to a tilted direction of the seatback.

5. The seat of claim 1, wherein the seatback bracket is provided in line with a belt line of the vehicle body and is connected to an upper end of the seatback, and the seat cushion bracket is provided at a front portion of a wheel housing of the vehicle body and is connected to a front end of the seat cushion.

6. The seat of claim 1, wherein the seatback has a first extension part extended in a top to down direction with a lower end thereof protruding in a longitudinal direction of the vehicle, and the seat cushion has a second extension part extended in a front to rear direction with a rear portion thereof protruding in a height direction of the vehicle, wherein the first extension part and the second extension part are rotatably connected to each other.

7. The seat of claim 6, wherein the second extension part is connected to the first extension part in a state where an end of the second extension part is inserted in the seatback.

8. The seat of claim 1, wherein the seatback bracket has a guide groove into which the first guide pin is inserted and seated, and the guide groove consists of an open slot configured to allow the first guide pin to be inserted into and taken out from the guide groove and a rotary slot connected to the open slot and configured to allow the first guide pin to be rotatable while remaining in a seated state.

9. The seat of claim 8, wherein the rotary slot is connected to the open slot with an indent portion formed in the open slot, and an entrance of the indent portion has an outer portion formed narrower than an inner portion thereof.

10. The seat of claim 8, wherein as the first guide pin of the seatback is inserted into or taken out through the open slot, the seat is assembled to or removed from the vehicle body.

11. The seat of claim 1, wherein the plurality of locking portions has a shape inclined in the top to down direction so that a front end of each of the locking portions is located higher than a rear end thereof.

12. The seat of claim 1, wherein the seat cushion bracket has a moving slot connected to the plurality of locking portions and configured to allow the second guide pin to be moved forward and rearward.

13. The seat of claim 12, wherein the moving slot has an opening at a front portion thereof and configured to allow the second guide pin to be inserted into or taken out from the locking portions.

14. The seat of claim 13, wherein when the seat is tipped up, the second guide pin of the seat cushion is removed through the opening of the moving slot, and when the seat cushion is rotated so that a seating surface of the removed seat cushion and a seating surface of the seatback are brought into contact with each other, the seat is tipped up.

15. The seat of claim 1, wherein the seatback comprises a headrest, and the seat cushion comprises a hook connector configured to be fastened to the headrest of the seatback to lock the headrest.

16. A vehicle comprising a seat of claim 1.

17. A vehicle comprising:

a seat for a vehicle, the seat comprising:

a seatback with a first guide pin protruding from each of opposite ends thereof;

a seat cushion rotatably coupled to the seatback, and with a second guide pin protruding from each of opposite ends thereof;

a seatback bracket provided in a vehicle body and located at each side of the seatback, configured to support load of the seatback while the first guide pin of the seatback is inserted thereinto, and configured to rotate the seatback on the first guide pin; and a seat cushion bracket provided in the vehicle body and located at each side of the seat cushion, having a plurality of locking portions to allow the second guide pin of the seat cushion to be selectively locked by the locking portions, and configured to determine a sliding position of the seat cushion in response to a locked position of the second guide pin.

\* \* \* \* \*